United States Patent Office 3,681,096
Patented Aug. 1, 1972

3,681,096
APPLIANCES FOR COOKING AND/OR HEATING FOODSTUFFS
Oscar Philipe, London, England, assignor to Anglo Swiss (Equipment Production) Limited, London, England
Filed Nov. 4, 1970, Ser. No. 86,756
Claims priority, application Great Britain, May 11, 1970, 22,557/70
Int. Cl. A47j 37/04
U.S. Cl. 99—339          9 Claims

ABSTRACT OF THE DISCLOSURE

An appliance for cooking and/or heating foodstuffs, comprising a heating chamber, an endless conveyor belt or chain running over pulleys or sprockets and having at least a portion of at least one run passing through the heating chamber and heating elements in the heating chamber located above and below the one run of the chain.

---

This invention relates to appliances for cooking and/or heating foodstuffs and is particularly concerned with an appliance for toasting bread, grilling meat, fruit, eggs, cheese etc. and for heating foodstuffs for example in dishes.

Known toasting and grilling appliances have the disadvantage that food can only be inserted in batches and must usually be manually removed after a certain time.

The present invention aims to overcome these disadvantages and to provide an appliance in which heat is evenly distributed with minimal heat losses, in which food can be continuously installed and which is compact so as to take up the minimum possible amount of space.

According to the invention, there is provided an appliance for cooking and/or heating foodstuffs, comprising a heating chamber, an endless conveyor belt or chain running over at least two pulleys or sprockets and having at least a portion of at least one run passing through the heating chamber, a first heating element in said chamber located above the or one run of the belt or chain and a second heating element in said chamber located below the said one run of the belt or chain.

Preferably, the endless conveyor belt or chain runs over a pulley or sprocket located adjacent one end of the heating chamber and another pulley or sprocket located remote from the heating chamber. It is also preferred that the first-mentioned pulley or sprocket be adjustably mounted in the heating chamber and that the second-mentioned pulley or sprocket be provided with drive means.

In a further preferred arrangement, the first heating element is located above the upper run of the belt or chain and the second heating element is located between the two runs of the belt or chain. The elements are desirably electrical elements.

The appliance according to the invention is particularly useful for toasting bread, buns and the like but it should be noted that the appliance is not restricted to this use. With the appliance according to the invention it is possible to toast or grill a very large quantity of food in a very short space of time.

The invention will now be further described, by way of example, with reference to the accompanying drawings which illustrate an appliance according to the invention in the form of a toasting machine and in which.

Figure 2:
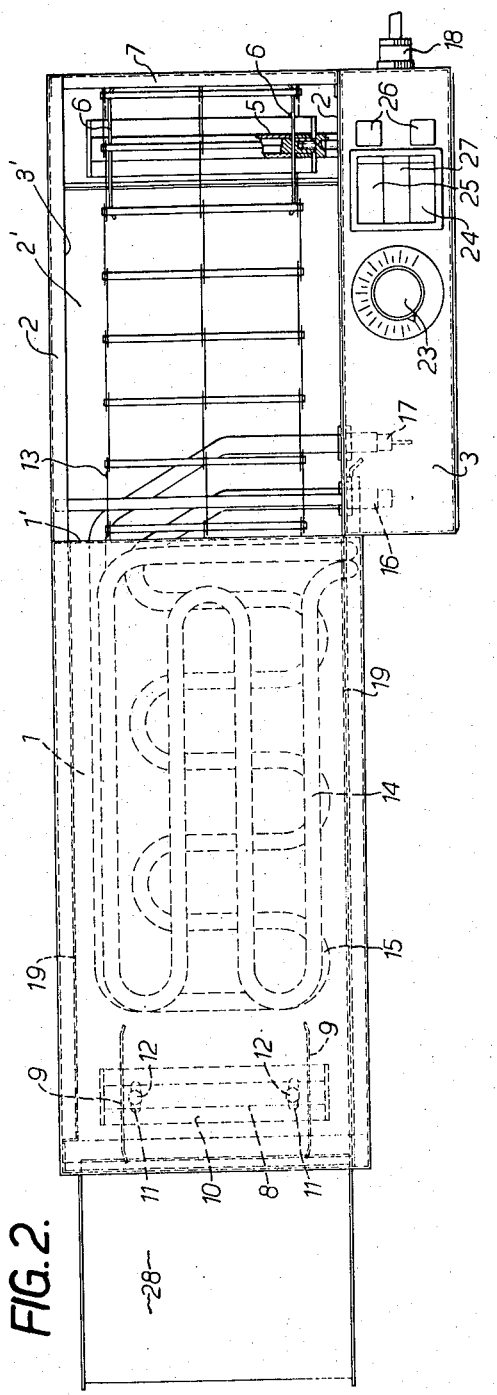
FIG. 2 is a plan view of the machine shown in FIG. 1.

Referring to the drawings, the toasting machine comprises a heating chamber 1 the side walls 2 of which extend beyond the chamber and a casing 3 which is secured to an extension of one side wall. The casing 3 contains an electric motor 4 which is arranged to drive a shaft 5 which extends through the said one side wall into the space between the two walls 2 as shown in FIG. 2. A pair of sprockets 6 are mounted on the shaft 5 and an end wall 7 is connected to the ends of the side wall extensions 2.

A shaft 8 carrying a pair of sprockets 9 is mounted in the heating chamber 1 at the end remote from the side wall extensions 2. The shaft 8 is adjustably mounted in the heating chamber by means of a bracket 10 which is provided in its base with a pair of elongated holes or slots 11. The bracket 10 is secured to the base of the heating chamber by means of bolts or screws 12 which pass through the holes or slots 11.

Figure 1:
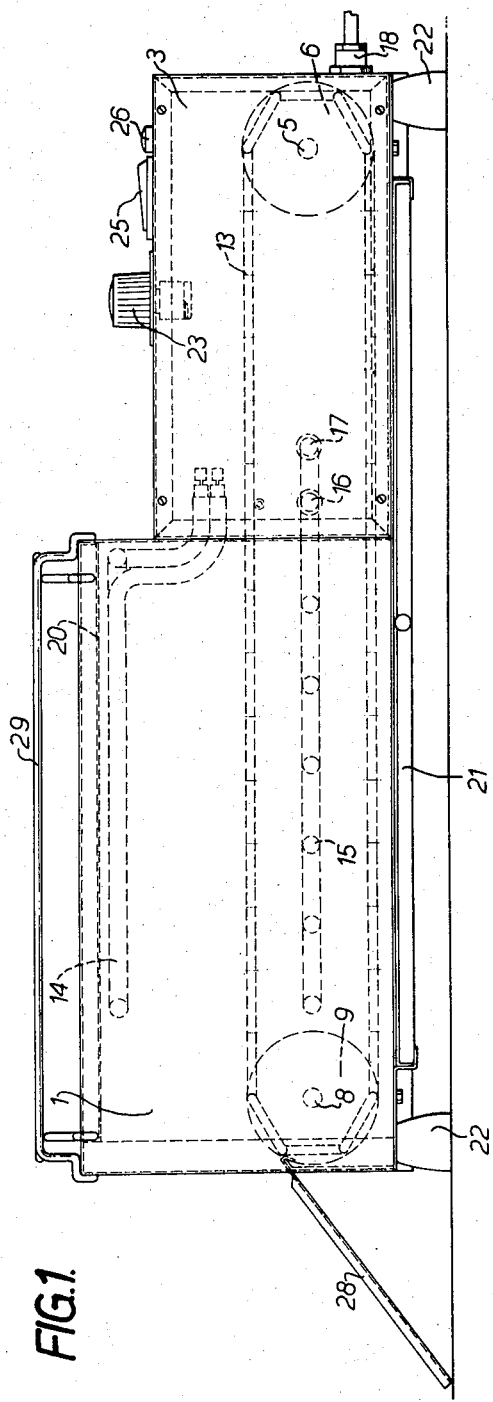
FIG. 1 is a side elevation of one embodiment of a toasting machine according to the invention.
Figure 3:
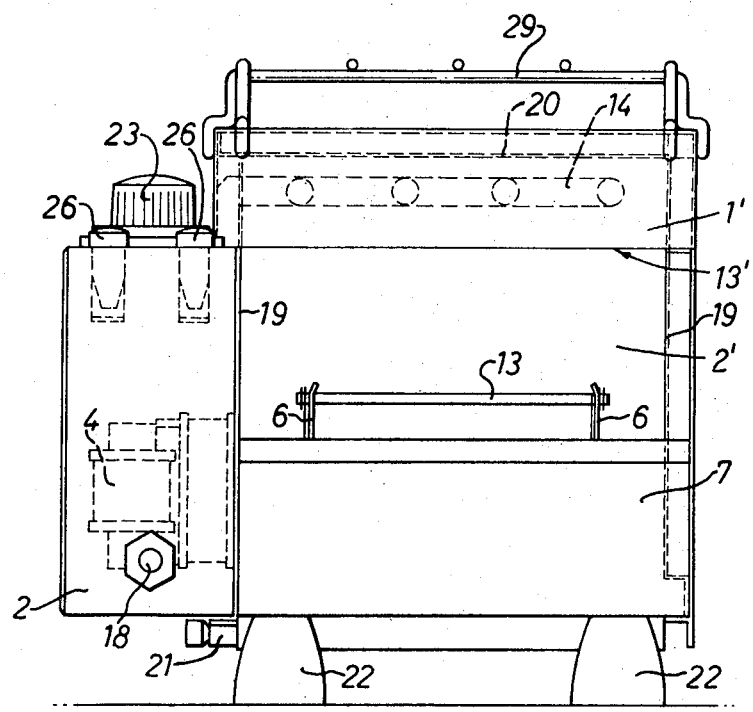
FIG. 3 is an end elevation of the machine shown in FIG. 1.

A conveyor chain 13 passes over the sprockets 6 and 9 through an opening 13' (FIG. 3) between the heating chamber 1 and admission chamber 2', and adjustment for the chain is provided by the holes or slots 11 in the bracket 10. The opening 13' is located below an end wall 1' at the end of the chamber 1 between the latter and the chamber 2'. The chamber 2' is open at the top, as indicated at 3' (FIG. 2) for access to the conveyor 13. A first electrical heating element 14 is mounted in the heating chamber 1 adjacent the top thereof and a second electrical heating element 15 is mounted in the heating chamber between the top and bottom runs of the chain as shown in FIG. 1. The heating elements extend into the casing 3 where the element 15 terminates in plug-in terminals 16 and 17. The element 14 terminates in a similar pair of plug-in terminals (not shown) and the electric motor 4 is also provided with a plug-in terminal 18 whereby electrical connections to the toasting machine can readily be made.

The heating chamber 1 is provided on each side with a heat reflecting surface 19 and a further heat reflecting surface 20 is provided at the top of the chamber. The bottom of the chamber is provided with a pull-out tray 21 for the disposal of crumbs and the like and this tray is also provided with a heat reflecting surface. An aperture is provided at the end of the heating chamber 1 adjacent the sprockets 9 to allow heated and/or cooked articles to pass out of the chamber and the chamber is further provided, at each corner, with a foot 22.

The top of the casing 3 is formed as a control panel having switches 24 and 25 respectively for operating the heating elements 14 and 15 and a switch 27 for the electric motor 4. Warning lamps 26 indicate when the heating elements 14 and 15 are operative. The speed of the motor 4 is regulated by a potentiometer which is controlled by a control knob 23. Thus, the speed of the conveyor chain 13 through the heating chamber 1 can be controlled by means of the control knob 23.

The casing 3 is heat insulated from the heating chamber 1, for example by means of sheets of asbestos applied to the inner surfaces of the casing 3 (not shown), so as to avoid overheating the electric motor and further so that an operator of the machine will not burn himself when operating the switches and control knob.

The upper heating element 14 is preferably adjustably mounted in the heating chamber 1 whereby the distance of the element from the upper run of the chain 13 can be varied.

When a slice of bread or a bun is to be toasted, the heating elements are switched on and after a predetermined time when the heating elements have fully warmed up, which time is dependent on the particular elements used, the motor 4 is started and the chain 13 driven in an anti-clockwise direction as viewed in FIG. 1. The bread or bun to be toasted is placed through the opening 3' at the top of the chamber 2' on the upper run of the conveyor chain between the two side wall extensions 2 and is conveyed by the chain into the heating chamber 1. The heating elements 14 and 15 which are above and below the upper run of the chain together with the heat reflecting surfaces 19, 20 and 21 ensure that the bread or bun is uniformly toasted all over except for the small areas actually in contact with the chain. After passing through the heating chamber the bread or bun is allowed to fall through the aperture at the outlet end. A slide 28 may be provided at this end of the chamber down which the bread or bun can slide. Alternatively, the bread or bun may simply be allowed to fall onto the surface supporting the machine.

The degree of browning of the toasting is governed simply by the speed of the conveyor chain which is controlled by the control knob 23. Thus a fast speed will give only light browning while a slower speed will give corresponding darker browning.

The electrical heating elements are preferably provided with means to enable them to be kept warm at a low wattage of, for example, 150 w. for each element, so that when the full operating wattage is applied, the elements are already pre-heated so that toasting can begin almost instantaneously without having to wait for the elements to be heated up from cold. This represents a great saving in operating costs since when the machine is used only intermittently, the elements use only 300 w. when not used and yet the machine can be used almost at once when toasting is required. In a further preferred arrangement, means are provided for operating the heating elements at half the full wattage when only light toasting or heating is required.

A grid 29 is preferably provided on top of the heating chamber whereby food or dishes can be placed on the grid and kept warm by the heat from the heating chamber.

Although the invention has been described above with reference to a toasting machine, it should be noted that this is only one example of the appliance according to the invention and that the appliance may be modified for cooking and/or heating foodstuffs other than bread or the like without departing from the scope of the invention.

I claim:

1. An appliance for cooking and/or heating foodstuffs, said appliance comprising a heating chamber, at least two pulleys or sprockets, an endless conveyor belt or chain running over a pair of first pulleys or sprockets located adjacent one end of said heating chamber and a pair of second pulleys or sprockets located remote from said heating chamber and mounted on respective shafts, a bracket upstanding in the chamber and mounting the shaft of the first pulley, said bracket having a base with a plurality of elongated holes or slot, and bolts or screws detachably passing through the holes or slots for adjusting the first-mentioned pulleys or sprockets to vary the tension of the belt or chain, said endless conveyor belt or chain having at least a portion of at least one run passing through said heating chamber, a heating element in said chamber located above one run of the belt or chain, drive means for said second-mentioned pulley or sprocket, said drive means being provided with means for varying the speed at which the second-mentioned pulley or sprocket is driven.

2. An appliance as claimed in claim 1, in which said heating chamber is provided, on its inner faces, with heat reflecting surfaces.

3. An appliance as claimed in claim 1, including a grid adapted to be fitted on the top of the heating chamber for keeping warm articles placed thereon.

4. An appliance as claimed in claim 1, including a second heating element in said chamber located below the cated between the two runs of the belt or chain.

5. An appliance as claimed in claim 4, in which said first heating element is located above the upper run of said belt or chain and said second heating element is located between the two runs of the belt or chain.

6. An appliance as claimed in claim 1, wherein said heating elements comprise electrical elements provided with preheating means.

7. An appliance for cooking foodstuffs comprising elongated opposite side walls enclosing a heating chamber at one end and an admission chamber at the opposite end, said chambers having a wall therebetween with an opening between the chambers, an endless conveyor extending from one end of the admission chamber through the wall opening to the opposite end of the heating chamber, said admission chamber having a supply opening therein above the endless conveyor for access therethrough to the conveyor to place articles of food by hand through the supply opening onto the conveyor, means in the heating chamber for heating the articles of food during passage through said heating chamber.

8. An appliance for cooking foodstuffs according to claim 7, wherein the endless conveyor comprises a belt or chain running over pulleys or sprockets and having at least one run extending through the admission chamber and the heating chamber.

9. An appliance for cooking foodstuffs according to claim 7, wherein electric heating elements are mounted in the top of the heating chamber extending from end to end thereof over the endless conveyor.

References Cited

UNITED STATES PATENTS

| 2,369,274 | 2/1945 | Beatty | 99—423 |
| 2,487,037 | 11/1949 | Smith | 219—395 |
| 2,765,391 | 10/1956 | Shroyer | 219—455 |
| 2,940,458 | 6/1960 | Speckman | 99—443-C X |
| 3,019,744 | 2/1962 | Carvel | 99—443-C X |
| 3,157,108 | 11/1964 | McKenney, Jr., et al. | 99—339 |
| 3,456,578 | 7/1969 | Pinsly | 99—386 X |
| 3,509,318 | 4/1970 | Brown | 99—339 |

WALTER A. SCHEEL, Primary Examiner

A. O. HENDERSON, Assistant Examiner

U.S. Cl. X.R.

99—443-C